United States Patent [19]

Basile et al.

[11] Patent Number: 5,736,062
[45] Date of Patent: Apr. 7, 1998

[54] AZEOTROPE-LIKE MIXTURES UTILIZABLE AS REFRIGERATING FLUIDS

[75] Inventors: Giampiero Basile, Alessandria; Ezio Musso, Castelleto D'Orba, both of Italy

[73] Assignee: Ausimont S.p.A., Milan, Italy

[21] Appl. No.: 600,151

[22] Filed: Feb. 12, 1996

Related U.S. Application Data

[63] Continuation of Ser. No. 287,248, Aug. 8, 1994, abandoned.

[30] Foreign Application Priority Data

Aug. 13, 1993 [IT] Italy ................... MI93A9081

[51] Int. Cl.⁶ .................................. C09K 5/04
[52] U.S. Cl. .................. 252/67; 510/177; 510/408; 510/410; 62/114
[58] Field of Search ............... 252/67, 172, DIG. 9; 62/114, 324.1; 510/177, 408, 410, 412, 415

[56] References Cited

U.S. PATENT DOCUMENTS

| | | | |
|---|---|---|---|
| 4,174,295 | 11/1979 | Bargigia et al. | 252/305 |
| 4,482,465 | 11/1984 | Gray | 252/67 |
| 4,943,388 | 7/1990 | Shankland et al. | 252/69 |
| 5,108,637 | 4/1992 | Pearson | 252/67 |
| 5,135,054 | 8/1992 | Nimitz et al. | 252/8 |
| 5,185,094 | 2/1993 | Shiflett | 252/67 |
| 5,211,867 | 5/1993 | Shankland et la. | 252/67 |
| 5,232,618 | 8/1993 | Shiflett | 252/67 |
| 5,234,613 | 8/1993 | Shiflett | 252/67 |
| 5,277,834 | 1/1994 | Bivens et al. | 252/67 |
| 5,403,504 | 4/1995 | Bivens et al. | 252/67 |
| 5,458,798 | 10/1995 | Lunger et al. | 252/67 |
| 5,616,276 | 4/1997 | Bivens et al. | 252/67 |
| 5,643,492 | 7/1997 | Shiflett | 252/67 |

FOREIGN PATENT DOCUMENTS

| | | |
|---|---|---|
| 011971 | 6/1980 | European Pat. Off. . |
| 0451692 | 10/1991 | European Pat. Off. . |
| 0583179 | 2/1994 | European Pat. Off. . |
| 583179 | 2/1994 | European Pat. Off. ......... C09K 5/04 |
| 63-105088 | 5/1988 | Japan . |
| 2-240186 | 9/1990 | Japan . |
| 9113968 | 9/1991 | WIPO . |
| 9201762 | 2/1992 | WIPO . |
| 9315162 | 8/1993 | WIPO . |

OTHER PUBLICATIONS

Database WPI, Week 8824, Derwent Publications Ltd., London, GB; AN 88–165818 & JP-A-63 105 088 (Sanyo Electric, Asahi Glass) 10 May 1988 *Abstract* and Patent Abstracts of Japan, vol. 12, No. 349 (C-529) 20 Sep. 1988 & JP-A-63 105 088 (Kanai Takeshi 10 May 1988 *Abstract*.

Primary Examiner—Douglas J. McGinty
Attorney, Agent, or Firm—Watson Cole Stevens Davis, P.L.L.C.

[57] ABSTRACT

Azeotrope-like mixtures, utilizable as refrigerating fluids in substitution of R-12 or R-502, constituted by hydrogen-(chloro)fluorocarbons, optionally in admixture with propane, cyclopropane or dimethylether.

4 Claims, No Drawings

AZEOTROPE-LIKE MIXTURES UTILIZABLE AS REFRIGERATING FLUIDS

This application is a continuation of application Ser. No. 08/287,248, filed Aug. 8, 1994, now abandoned.

The present invention relates to refrigerating mixtures, more particularly to refrigerating mixtures utilizable in circuits working according to the Rankine cycle.

As known, R-12 ($CCl_2F_2$) is the most widely used refrigerant for circuits working at middle-high temperatures, while R-502 (a mixture of R-22 ($CHClF_2$) and R-115 ($CClF_2CF_3$) is used for the refrigeration at middle-low temperatures, in particular for commercial refrigeration. It is also known that, because of the high depleting potential of R-12 and R-115 with respect to ozone present in the stratosphere, manufacturing and marketing of such products, and more generally of chlorofluorocarbons (CFC), will be restricted or banned within a few years as stipulated by some International agreements (Montreal Protocol and subsequent amendments).

Therefore, the need to develop other products or compositions capable of effectively replacing R-12 and R-502, without causing environmental damages, is particularly great. For this purpose, it was suggested using hydrofluorocarbons (HFC) or hydrochlorofluorocarbons (HCFC), whose depleting potential with respect to ozone (Ozone Depleting Potential, ODP) is very low or even is also very low as their contribution to the so called "greenhouse effect" is also very low as measured by the Global Warming Potential (GWP).

However, for the time being, the proposed substitute products, such as R-134a ($CF_3CHF_2$) and R-125 ($CF_3CHF_2$), show in many applications a refrigerant capacity, measured by the Coefficient of Performance (COP), lower than that of R-12 and R-502; for instance R-125, depending on the working conditions, has a COP 10–15% lower than that of R-502.

In order to overcome the drawbacks of single refrigerants, the use of mixtures based on HCFC and/or HFC has been proposed. However, if casual mixtures are employed, other inconveniences are encountered. First, because of the different volatility of the components, fractionation occurs when passing from the liquid phase to the vapour phase and viceversa, with a remarkable variation in the condensation and evaporation temperatures. This variation impairs the efficiency of the refrigerating circuit. Moreover, the need to replace volumes of the refrigerant, which is necessary in consequence of unavoidable losses from the refrigerating equipment, cannot be carried out with the original mixture; it is necessary to proportion the various components according to the exact composition of the mixture remaining after fractionation, so as to restore the initial optimum composition. Lastly, if the mixture contains a more volatile, inflammable component, the vapour phase becomes so enriched in such a component that the inflammability point is reached, with evident hazards during its use. Similarly, if the inflammable component is less volatile, it concentrates in the liquid phase, giving rise to an inflammable liquid.

In order to avoid such drawbacks, it is therefore convenient to use mixtures having an azeotropic behaviour, i.e. mixtures characterized in that they behave as pure fluids. However, the obtainment of azeotropic mixtures is an extremely rare event, since it requires a particular combination of boiling temperatures and deviations from the ideal behaviour of the various components. Therefore, the study of refrigerating mixtures has been directed to the obtainment of azeotrope-like mixtures. The definition, among those suggested, which better suits the purposes of the present invention, is that a azeotrope-like behaviour occurs if the percentage pressure variation in consequence of a 50% evaporation of the liquid (indicated as $\Delta p/p.100$) is comprised between 5 and 15%, preferably between 5 and 10% (in this respect see the article by D. A. Didion and D. B. Bivens in int. J. Refrig., vol. 13, p. 163 and following, 1990).

A further characteristic desirable for the substituents of the CFC-based refrigerants is that they shall require little if modifications of elements, materials and, generally, components of the system in which they operate: in this case the azeotrope-like can be called a "drop-in" substitutes. In particular, it would be advantageous having a product or a mixture soluble in the lubricating mineral or alkyl-benzenic oils commonly used with conventional refrigerants, or soluble in an oil compatible with the oils used at present. In such a way, before introducing the new refrigerant, complex operations of complete discharging, accurate washing and drying of the refrigerating plants are be avoided.

The Applicant has unexpectedly found that mixtures based on HFC and/or HCFC as hereinunder defined, have azeotrope-like behaviour as defined above, are non-flammable, and are characterized by vapour pressure curves such as to make them particularly suitable as substitutes for refrigerants R-12 or R-502. Such mixtures are at the same time characterized by an environmental impact, expressed in terms of OPD and GWP, very low or null.

Therefore, an object of the present invention is the production of azeotrope-like mixtures, utilizable as refrigerating fluids, consisting essentially of: (I) from 20 to 59% of $CF_3$—$CHF_2$ R-125), from 40 to 75% of $CHClF_2$ (R-22), and from 1 to 10% of cyclopropane (RC-270); (II) from 20 to 42% of $CF_3$—$CH_3$ (R-143a), from 57 to 75% of R-22, and from 1 to 5% of propane (R-290); (III) from 5 to 30% of $CH_2F_2$ (R-32), from 68 to 90 of R-22, and from 1 to 5% of R-290; (IV) from 49 to 60% of R-125, from 35 to 49% of R-143a, and from 1 to 5% of RC-270 or R-290; (V) from 5 to 10% of R-32, from 50 to 60% of R-125, and from 30 to 40% of R-143a; (VI) from 20 to 50% of R-125, from 5 to 20% of R-143a, from 1 to 5% of R-290, and from 40 to 60% of R-22; (VII) from 2 to 8% of R-32, from 88 to 97% of $CF_3$—$CH_2F$ (R-134a), and from 1 to 5% of dimethylether (DME); (VIII) from 3 to 10% of R-143a, from 85 to 96% of R-134a, and from 1 to 5% of DME; or (IX) from 5 to 20% of R-125, from 75 to 90% of R-134a, and from 1 to 5% of DME; the percentages being expressed by weight.

More specifically, it has been found that the mixtures from (I) to (VI) have a vapour pressure curve which renders them particularly suitable as substitutes for R-502, while the mixtures from (VII) to (IX) can be advantageously used as substitutes for of R-12. Among the mixtures from (I) to (VI), the mixtures (I), (II), (III) and (VI) are particularly preferred, since of the "drop-in" type, being characterized by a very good compatibility with the mineral or alkyl-benzenic lubricating oils contained in the refrigerating circuits operating at present with R-12 and R-502.

Generally, the mixtures object of the present invention, being constituted by different refrigerants, exhibit greater flexibility and better thermodynamic and thermophysical characteristics for certain refrigerating circuit configurations than single component working fluids.

Moreover, thanks to their quasi-azeotropic behaviour, said mixtures do not fractionate into liquids or inflammable vapours even after substantial evaporations, around 50% by weight.

A further advantage of the mixtures of the present invention is that, once dissolved in the lubricating oil, they do not cause, also at high temperatures and for long contact times, noticeable alterations in the chemical-physical characteristics of both the oil and the metal surfaces usually present in the refrigerating circuits.

Some working examples of the present invention are hereinunder reported, whose purpose is merely illustrative but not limitative of the scope of the invention itself.

EXAMPLES 1–9

Various mixtures according to the present invention were prepared: the compositions, expressed as % by weight, are reported in Table 1. Each mixture was characterized according to the following tests:

(a) Azeotrope-like Behaviour

The mixture, of known composition and weight, was introduced into a previously evacuated small cylinder having an internal volume of 100 cm$^3$. The filling volume ratio was initially equal to 0.8. The cylinder was introduced into a thermostatic bath at 25° C. As soon as the equilibrium was reached, the inner pressure was measured by means of a pressure transducer. The content of the cylinder was then partly discharged by means of a suitable valve, until the cylinder weight reached a value corresponding to 50% of the initial load, keeping the temperature at 25° C. The pressure inside the tube was measured again at 25° C. The mixture had a quasi-azeotropic behaviour if the pressure drop, expressed as percentage with respect to the initial pressure ($\Delta p/p \cdot 100$), was comprised between 5 and 15%, preferably between 5 and 10%.

(b) Vapour Pressure Curve and Boiling Temperature

Using the same cylinder described above, filled with the refrigerating mixture up to a volume ratio of 0.8 and immersed into the thermostatic bath, the equilibrium pressure was measured at different temperatures (−25°, 0°, +25°, +50° C.). The boiling temperature was determined by slowly reducing the temperature of the thermostatic bath until the equilibrium pressure of 1.013 bar was reached: the temperature corresponding to such a pressure was the boiling temperature of the mixture.

(c) Inflammability

The inflammabilities of the liquid and of the vapour phases were determined, according to ASTM Method E-681, both on the initial mixture and after evaporation of 50% by weight of the mixture itself. The measurement was thus carried out for each mixture on four samples, two in the liquid phase and two in the vapour phase, so as to simulate the effect that would be achieved after a loss from storage containers or from feeding lines, with leakage of potentially flammable vapours and/or liquids. In any case, the samples been rendered non-flammable.

(d) Solubility in Lubricating Oil

The oil was loaded in a test tube having thick walls resistant to high pressures. After cooling at −30° C., the refrigerating mixture was introduced and the test tube was then flame-closed and immersed in a thermostatic bath. The temperature was slowly increased up to 60° C. and then reduced until clouding was noticed (cloud point).

(e) ODP and GWP

ODP and GWP are calculated on the basis of the values of pure components and of the composition of each mixture (weighted average).

The results are reported in Table 1. For comparative purposes, the same measurements were carried out on R-502 (mixture constituted by 48.8% by weight of R-22 and 51.2% by weight of R-115) (Example 9).

For the mixtures of Examples 1–3, the stability test in the presence of metals (copper or steel) was carried out, according to ASHRAE Method 97-1983 (RA 89), with some minor modifications, as reported hereinafter. The same test was repeated for the above R-502 mixture.

One copper and one steel coupon and about 1 ml of synthetic mineral oil ZERICE$^{(R)}$ S46 (Exxon) were introduced into a glass tube, having a 4.5 mm diameter and a 250 mm height. The glass tube was then inserted into a steel cylinder fitted to contain exactly the tube, and equipped with a valve. The cylinder was evacuated and then cooled in a thermostatic bath at −30° C. About 1 ml of refrigerating mixture, cooled at −30° C., was then introduced into the cylinder. The closed cylinder was kept in a stove at 175° C. for 14 days.

After such treatment, the cylinder was opened and the refrigerant evaporated inside a sampler, whose content was then analyzed by gas chromatography to detect the presence of possible by-products (deriving from the decomposition either of the refrigerant itself or of the mineral oil). The oil was titrated to determine acidity (expressed as mg KOH/ g oil). The metal coupons were submitted to visual examination to reveal possible changes in the surface appearance due to corrosion; for the steel coupons the presence of possible copper deposits (the so called "copper plating") was also determined. The extent of such phenomena was evaluated by means of an empirical index varying from 0 (no effect) to 8 (marked effect). The results are reported in Table 2.

TABLE 1

| EX. | COMPOSITION (% by weight) | | QUASI-AZEOTROPIC BEHAVIOUR ($\Delta p/p \cdot 100$) | BOILING TEMP. (°C.) | VAPOUR PRESSURE (abs. bar) | | | | BEHAVIOUR IN OIL | | INFLAM-MABILITY | ODP | GWP |
|---|---|---|---|---|---|---|---|---|---|---|---|---|---|
| | | | | | −25° C. | 0° C. | +25° C. | +50° C. | SOLUBILITY (% by wt.) | CLOUDY POINT (°C.) | | | |
| 1 | R-125 | 26.0 | 7.4 | −44.2 | 2.29 | 5.54 | 11.46 | 21.10 | 10.9 (a) | −17 | negative | 0.04 | 0.43 |
| | R-22 | 72.0 | | | | | | | | | | | |
| | RC-270 | 2.0 | | | | | | | | | | | |
| 2 | R-143a | 28.0 | 2.1 | −44.5 | 2.32 | 5.56 | 11.41 | 20.90 | 10.7 (a) | −14 | " | 0.035 | 0.41 |
| | R-22 | 70.0 | | | | | | | | | | | |
| | R-290 | 2.0 | | | | | | | | | | | |
| 3 | R-32 | 9.7 | 5.04 | — | 2.83 | 6.30 | 12.3 | 21.5 | 9.78 (a) | −44 | " | 0.04 | 0.30 |

TABLE 1-continued

| | | | QUASI-AZEOTROPIC BEHAVIOUR | BOILING TEMP. | VAPOUR PRESSURE (abs. bar) | | | | BEHAVIOUR IN OIL | | | | |
| | | | | | | | | | SOLUBILITY | CLOUDY POINT | INFLAM- | | |
| EX. | COMPOSITION (% by weight) | | (Δp/p · 100) | (°C.) | −25° C. | 0° C. | +25° C. | +50° C. | (% by wt.) | (°C.) | MAMABILITY | ODP | GWP |
|---|---|---|---|---|---|---|---|---|---|---|---|---|---|
|  | R-22 | 86.1 |  |  |  |  |  |  |  |  |  |  |  |
|  | R-290 | 4.2 |  |  |  |  |  |  |  |  |  |  |  |
| 4 | R-125 | 50.0 | 2.54 | −49.0 | 2.79 | 6.63 | 13.45 | 24.52 | 9.50 (b) | −45 | " | 0 | 0.76 |
|  | R-143a | 48.0 |  |  |  |  |  |  |  |  |  |  |  |
|  | RC-270 | 2.0 |  |  |  |  |  |  |  |  |  |  |  |
| 5 | R-32 | 5.0 | 1.46 | — | 3.02 | 6.94 | 13.60 | 24.70 | 9.69 (b) | −52 | " | 0 | 0.76 |
|  | R-125 | 60.0 |  |  |  |  |  |  |  |  |  |  |  |
|  | R-143a | 35.0 |  |  |  |  |  |  |  |  |  |  |  |
| 6 | R-32 | 7.3 | 8.9 | −37.5 | 1.53 | 3.64 | 7.75 | 14.78 | 9.43 (b) | −40 | " | 0 | 0.23 |
|  | R-134a | 90.2 |  |  |  |  |  |  |  |  |  |  |  |
|  | DME | 2.5 |  |  |  |  |  |  |  |  |  |  |  |
| 7 | R-143a | 6.0 | 4.0 | −35.8 | 1.47 | 3.37 | 7.16 | 13.67 | 10.4 (b) | <−70 | " | 0 | 0.27 |
|  | R-134a | 91.5 |  |  |  |  |  |  |  |  |  |  |  |
|  | DME | 2.5 |  |  |  |  |  |  |  |  |  |  |  |
| 8 | R-125 | 12.9 | 6.0 | −37.8 | 1.54 | 3.62 | 7.52 | 14.09 | 9.42 (b) | <−70 | " | 0 | 0.32 |
|  | R-134a | 84.7 |  |  |  |  |  |  |  |  |  |  |  |
|  | DME | 2.4 |  |  |  |  |  |  |  |  |  |  |  |
| 9* | R-22 | 48.8 | 0 | −45.5 | 2.42 | 5.64 | 11.4 | 20.85 | 10.0 (a) | −22 | " | 0.23 | 3.75 |
|  | R-115 | 51.2 |  |  |  |  |  |  |  |  |  |  |  |

*comparative.
(a) mineral oil ZERICE® S46 (Exxon)
(b) ester oil ICEMATIC® SW32 (Castrol)

TABLE 2

| | OIL | | METALS | | | BY-PRODUCTS (ppm) |
| EX. | Colour ($) | Acidity (mgKOH/g) | Steel ($) | Copper ($) | Copper Plating ($) | |
|---|---|---|---|---|---|---|
| 1 | 1 | 0.23 | 0 | 0.5 | 0 | 100 |
| 2 | 2 | 0.22 | 0 | 0 | 0 | 50 |
| 3 | 2 | 0.20 | 0 | 0.2 | 0 | <50 |
| 9* | 2.5 | 0.23 | 0 | 0.5 | 0 | <50 |

*comparative (R-502)
($) visual evaluation (scale from 0 to 8)

EXAMPLE 10–13

Mixtures of type (II) (Example 10) and type (VI) (Example 11) were tested in a refrigerator for freezed food as regards refrigerant capacity and Coefficient of Performance (COP). For the sake of comparison, the same tests were carried out on a standard R-502 mixture (Example 12, comparative) and on a R-125/R-290/R-22 mixture (Example 13, comparative).

The tests were carried out on a commercial refrigerator for freezed food, having an internal free volume of 1290 dm³, and equipped with a hermetic compressor, a heat exchanger, and a motorized laminating valve for fluid expansion. The compressor used an alkyl benzenic lubricating oil ZERICE® S46 (Exxon). The refrigerator was equipped with manometers and thermocouples for measuring pressures and temperatures at inlets and outlets of compressor, condenser and evaporator. The refrigerator was placed into a room at 25°±1° C., and with a relative humidity of 60±5%, and the internal temperature was kept at −20° C. by means of electric resistances. The temperature of the refrigerant at the evaporator outlet was also kept at −20° C. The measurements of the refrigerant capacity were carried out in steady state conditions by standard techniques (calorimetric method). The COP was calculated as ratio between the refrigerant capacity and the overall absorbed electric power. Some of the mixtures were also tested for oil solubility, determining the cloud point as described above. The results are reported in Table 3.

On the mixture of Example 11, having composition R-125 31.0%; R-143a 10.0%; R-290 2.0%; R-22 57.0% (by weight), the following further measurements were carried out, according to the methods described hereinbefore:

Quasi-azeotropic behaviour (Δp/p.100): 2.8;
Boiling temperature (1.013 bar): −45.5° C.;
Vapour pressure (abs. bar): 2.40 at −25° C.; 5.77 at 0° C.; 11.84 at +25° C.; 21.74 at +50° C.;
ODP: 0.029; GWP: 0.66.

TABLE 3

| EXAMPLE | 10 | | 11 | | 12(*) | | 13(*) | |
|---|---|---|---|---|---|---|---|---|
| Mixture composition (% w) | R-143a | 41.0 | R-125 | 31.0 | R-22 | 48.8 | R-125 | 41.0 |
|  | R-290 | 2.0 | R-143a | 10.0 | R-115 | 51.2 | R-290 | 2.0 |
|  | R-22 | 57.0 | R-290 | 2.0 | (°) |  | R-22 | 57.0 |
|  |  |  | R-22 | 57.0 |  |  |  |  |

TABLE 3-continued

| EXAMPLE | 10 | 11 | 12(*) | 13(*) |
|---|---|---|---|---|
| Cloudy Point (°C.) (with oil ZERICE® S46) | — | −15 | — | −8 |
| Refrigerant Mass (g) | 875 | 876 | 990 | 876 |
| Compressor Suction Temp. (°C.) | −11.7 | −11.5 | −13.0 | −11.6 |
| Compressor Discharge Temp. (°C.) | 110.4 | 107.5 | 102.2 | 106.9 |
| Compressor Suction Pressure (KPa) | 199 | 198 | 185 | 198 |
| Compressor Discharge Pressure (KPa) | 1675 | 1688 | 1579 | 1697 |
| Pressure Ratio | 8.42 | 8.52 | 8.53 | 8.57 |
| Condenser Inlet Temp. (°C.) | 103.6 | 101.0 | 94.0 | 100.2 |
| Condenser Outlet Temp. (°C.) | 33.0 | 32.2 | 32.0 | 32.0 |
| Evaporator Inlet Temp. (°C.) | −24.7 | −24.5 | −24.5 | −24.6 |
| Evaporator Outlet Temp. (°C.) | −19.9 | −20.0 | −19.9 | −20.0 |
| Refrigerant Capacity (W) | 1006 | 900 | 858 | 863 |
| COP | 0.70 | 0.69 | 0.65 | 0.68 |

(*)comparative
(°) R-502

We claim:

1. Azeotropic-like compositions consisting essentially of, by weight, from 20 to 50% of $CF_3CHF_2$ (R 125), from 5 to 20% of $CF_3CH_3$ (R 143a), from about 1 to 5% of $CH_3CH_2CH_3$ (R 290), and from 40 to 60% of $CHClF_2$ (R 22), wherein the vapor pressure (abs. bar) for said compositions changes by about 5 to about 15% after about 50% of the composition has been evaporated at 25° C.

2. An azeotrope-like composition according to claim 1 consisting essentially of, by weight, about 31% $CF_3CHF_2$ (R 125), about 10% $CF_3CH_3$ (R 143a), about 2% $CH_3CH_2CH_3$ (R 290), and about 57% $CHClF_2$ (R 22), wherein the vapor pressure (abs. bar) of said composition ranges from about 2.40 at −25° C. to about 21.7 at 50°, and wherein the vapor pressure for said composition changes by about 2.8% after about 50% of said composition has evaporated.

3. A method for cooling a body comprising evaporating the composition of claim 1 in the vicinity of said body.

4. A method for cooling a body comprising evaporating the composition of claim 2 in the vicinity of said body.

* * * * *